J. P. GARTON.
Car-Axle Journals.

No. 150,561.

Patented May 5, 1874.

WITNESSES.

INVENTOR
James P. Garton
per C. H. Watson & Co.
ATTORNEYS.

UNITED STATES PATENT OFFICE.

JAMES P. GARTON, OF JERSEY CITY, NEW JERSEY.

IMPROVEMENT IN CAR-AXLE JOURNALS.

Specification forming part of Letters Patent No. 150,561, dated May 5, 1874; application filed April 18, 1874.

*To all whom it may concern:*

Be it known that I, JAMES P. GARTON, of Jersey City, in the county of Hudson and State of New Jersey, have invented certain new and useful Improvements in Journal-Boxes; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in providing a car-axle journal with one or more circumferential grooves for the reception of loose perforated rings which fit in circumferential grooves on the interior of the journal-box, as will be hereinafter more fully set forth.

Figure 1:
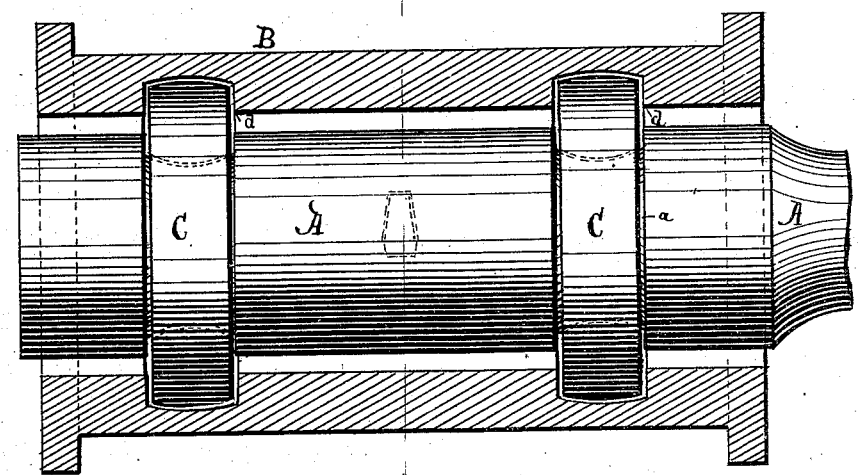
Figure 2:
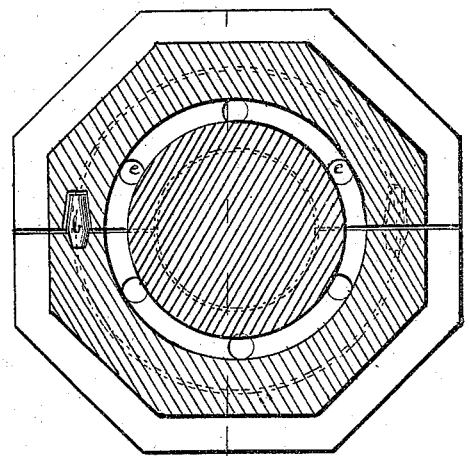
Figure 3:
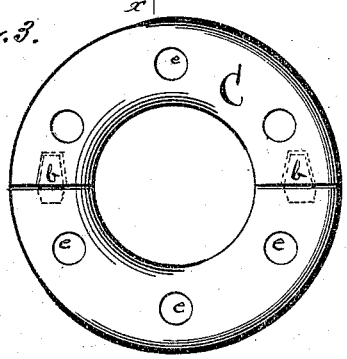

In the accompanying drawing, Figure 1 is a side elevation, with box in section. Fig. 2 is a section through line $y$ $y$, Fig. 1. Fig. 3 is a plan view of the ring.

A represents the journal of a car-axle, and B is the journal-box for the same. On the journal A are made one or more circumferential grooves, $a$, which may be of any desired width and depth, and the bottoms of which are preferably made concave. In each of the grooves $a$ is placed a loose ring, C, of such width as to project a suitable distance beyond the surface of the journal. These rings are perforated, as shown at $e$, so as to give free passage for the oil from one end of the journal-box to the other. Each ring is made in two pieces, united together by dowel-pins $b$ $b$. Around the inner circumference of the journal-box B are made a corresponding number of grooves, $d$ $d$, in which the rings C C fit; but said grooves are not as deep as the distance the rings project beyond the surface of the journal; hence no part of the journal itself will come in contact with the box, but be entirely supported by the rings C C.

By this means the friction is reduced very materially, and still more so on account of the rings being loose on the journal, because the journal will thereby be allowed to turn in a movable bearing, or in a bearing which itself turns in the journal-box.

Having thus fully described my invention, what I claim as new, and desire to secure by Letters Patent, is—

The combination of the axle-journal A, provided with circumferential groove or grooves $a$, loose perforated ring or rings C placed therein, and the box B, provided with interior circumferential groove or grooves $d$, all substantially as and for the purposes set forth.

In testimony that I claim the foregoing as my own I affix my signature in presence of two witnesses.

JAMES P. GARTON.

Witnesses:
    JAS. C. McDOWELL,
    HARRY A. GARTON.